Patented Mar. 16, 1937

2,074,179

UNITED STATES PATENT OFFICE 2,074,179

ANTHRAQUINONE DYESTUFFS

Norman Hulton Haddock, Frank Lodge, and Colin Henry Lumsden, Blackley, Manchester, England, assignors to Imperial Chemical Industries Limited, a corporation of Great Britain No Drawing. Application November 11, 1935, Serial No. 49,322. In Great Britain November 14, 1934

4 Claims. (Cl. 260—60)

This invention relates to new anthraquinone dyestuffs.

These dyestuffs are 1-amino-, methylamino-, or hydroxy - 4 - phenylaminoanthraquinonesulphonic acids which carry an alkoxy ($C_3$—$C_{20}$) or alkylthiol ($C_3$—$C_7$) substituent in the phenyl radical.

The dyestuffs dye wool and other animal fibres from neutral or slightly acid baths, preferably with the addition of a dyeing assistant, such as cetyl sodium sulphate or Glauber's salt in bright fast shades. The shades are especially fast to severe washing and milling and do not need chroming.

We make the dyestuffs by interacting a 1-chloro-, or 1-bromo-4-amino-, methylamino-, or hydroxyanthraquinone with an alkoxy ($C_3$—$C_{20}$) or alkylthiol ($C_3$—$C_7$) aniline, and then when the product is not already a sulphonic acid with sufficient solubility, introducing a sulpho substituent. A sulpho substituent may be introduced by sulphonating or where there is a chloro or bromo substituent in the 3-position in the starting material, if desired, by treating with a soluble sulphite.

Interaction of the anthraquinone derivative with the aniline may be effected for example by heating in a solvent with a copper catalyst and an acid absorber; the solvent may be for instance pyridine or excess of the aniline or where there is a sulpho group present it may be water. Sulphonation may be done with concentrated sulphuric acid or oleum and replacement of a chloro or bromo substituent with a sulpho substituent by treating with a soluble sulphite in a mixture of for example phenol and water.

The dyestuffs may carry simple substituents for example methyl, chloro or bromo substituents, although valuable dyestuffs are obtained without these. The substituents may be introduced through either starting material. Either starting material may carry a sulpho substituent.

The following examples illustrate, but do not limit the invention, the parts being by weight.

*Example 1.*—9.5 parts of 1,3-dibromo-4-aminoanthraquinone, 14 parts of dodecyloxyaniline (made by condensing dodecyl bromide with p-nitrophenol and reducing) 2.5 parts of potassium acetate, 0.2 part of copper acetate crystals and 20 parts of pyridine are stirred together at 115–120° C. for 24 hours, cooled, filtered and the solid washed successively with pyridine, alcohol and water, and dried. The product, 2-bromo-1-amino-4-p-dodecyloxyanilinoanthraquinone is a blue crystalline powder, soluble in cold benzene with a bright blue colour. It dissolves in concentrated sulphuric acid with a blue colour, and is reprecipitated in green-blue flocks by adding water.

20 parts are dissolved in 240 parts of molten phenol. The solution is put into an autoclave with a solution of 100 parts of sodium sulphite crystals in 120 parts of water. The mixture is heated at 170–175° C. for 8 hours, then the phenol is steamed off, the solid is filtered off, dried, and purified by extracting impurities with cold benzene. The resulting dyestuff 1-amino-4-p-dodecyloxyanilinoanthraquinone - 2 - sulphonic acid is a dark blue powder, soluble in warm water with a blue colour. It dyes wool in bright blue shades which have excellent fastness to severe washing, milling and light.

When p-butoxyaniline or p-octyloxyaniline is used in place of p-dodecyloxyaniline, similar blue dyestuffs are obtained, which dye in shades of excellent fastness to light; very good fastness to milling and good fastness to severe washing.

*Example 2.*—1 part of the dyestuff from Example 1 is dissolved in 3000 parts of water containing 1.5 parts of 15% cetyl sodium sulphate paste. 50 parts of well-wetted woolen yarn are entered, the dye-bath raised to the boil in ½ hour and kept at the boil for 1 hour. The dyed yarn is removed, rinsed in cold water and dried. A blue shade is obtained, which has similar fastness but is brighter than when no cetyl sodium sulphate is used.

*Example 3.*—5 parts of 1,3-dibromo-4-aminoanthraquinone, 20 parts of 4-aminophenyl butyl sulphide (made by interacting p-aminothiophenol and butyl bromide), 3 parts of potassium acetate and 0.1 part of copper acetate crystals are heated with stirring at 150–160° C. for 16 hours. The mixture is diluted with alcohol, cooled to 30° C., filtered and washed with alcohol and then water and dried. The product is dark blue, crystalline, melts at 175° C., and dissolves in benzene with a blue colour.

5 parts are mixed with 50 parts of phenol, 12 parts of sodium sulphite crystals and 25 parts of water and heated in an autoclave at 170–175° C. for 16 hours. The phenol is steamed off and salt is added to coagulate the dyestuff which is then filtered, dried, powdered and extracted with petroleum ether to remove the little soluble impurity.

The new dyestuff 1-amino-4-p-butylmercaptoanilinoanthraquinone-2-sulphonic acid dissolves in warm water with a blue colour. It dyes wool in bright greenish-blue shades of good fastness to severe washing and very good fastness to milling.

*Example 4.*—10 parts of 1-chloro-4-hydroxyanthraquinone, 13 parts of p-dodecyloxyaniline, 0.2 part of copper acetate crystals, 5 parts of potassium acetate and 10 parts of the monoethyl ether of ethylene glycol are stirred at 130–140° C. for 20 hours. The mixture is cooled, the mass broken up and extracted with cold alcohol until nothing more is removed. The residue when dry is a dark blue crystalline powder soluble in benzene with a bright bluish-violet colour.

5 parts of this 1-p-dodecyloxyaniline-4-hydroxy-anthraquinone are dissolved in 50 parts of 100% sulphuric acid at 20–25° C. 5 parts of "oleum" (25% $SO_3$) are added, the mixture stirred for 1 hour and poured into ice and water. The precipitated dyestuff is filtered and washed with a little salt solution. It is now dissolved in hot alcohol and an excess of caustic soda liquor added when the sodium salt of the dyestuff is precipitated as copper coloured crystals. These are filtered, washed with alcohol and dried.

The new dyestuff, 1-p-dodecyloxyanilino-4-hydroxyanthraquinonesulphonic acid, dissolves in hot water with a bright blue colour, and dyes wool in blue-violet shades which are very fast to severe washing and milling.

When either p-isoamyloxyaniline or p-octyloxyaniline is used in place of p-dodecyloxyaniline, dyestuffs dyeing wool in similar blue-violet shades of very good fastness to milling and light, and good fastness to washing are obtained. Also when 1-bromo-4-methylaminoanthraquinone is used in place of 1-chloro-4-hydroxyanthraquinone greenishblue dyestuffs of similar fastness properties are obtained.

We claim:

1. A 1-phenylaminoanthraquinone sulfonic acid carrying in the 4 position a group of the class consisting of —$NH_2$, —$NHCH_3$, and —OH, and carrying in the phenyl group a radical of the class consisting of alkoxy and alkylthiol radicals, in which the alkyl group of the alkoxy radical contains from 3 to 20 carbon atoms and the alkyl group of the alkylthiol contains from 3 to 7 carbon atoms, the sulfonic acid group being present in either of the aromatic radicals of the compound.

2. A 1-phenylamino-4-amino-2-anthraquinonesulfonic acid carrying in the phenyl group a radical of the class consisting of alkoxy and alkylthiol radicals, in which the alkyl group of the alkoxy radical contains from 3 to 20 carbon atoms and the alkyl group of the alkylthiol contains from 3 to 7 carbon atoms.

3. A 1-phenylamino-4-amino-2-anthraquinonesulfonic acid which carries in the phenyl group an alkoxy radical in which the alkyl group contains from 3 to 20 carbon atoms.

4. In the process for preparing new anthraquinone vat dyestuffs the step which comprises reacting a 1-halogen-anthraquinone carrying in the 4 position a group of the class consisting of —$NH_2$, —$NHCH_3$, and —OH with aniline, which carries as a nuclear substituent a radical of the class consisting of alkoxy and alkylthiols in which the alkyl group of the alkoxy radical contains from 3 to 20 carbon atoms and the alkyl group of the alkylthiol contains from 3 to 7 carbon atoms.

NORMAN HULTON HADDOCK.
FRANK LODGE.
COLIN HENRY LUMSDEN.